June 16, 1942.  H. L. MERRICK  2,286,297
INTEGRATING MEANS
Filed Nov. 22, 1938  3 Sheets-Sheet 1
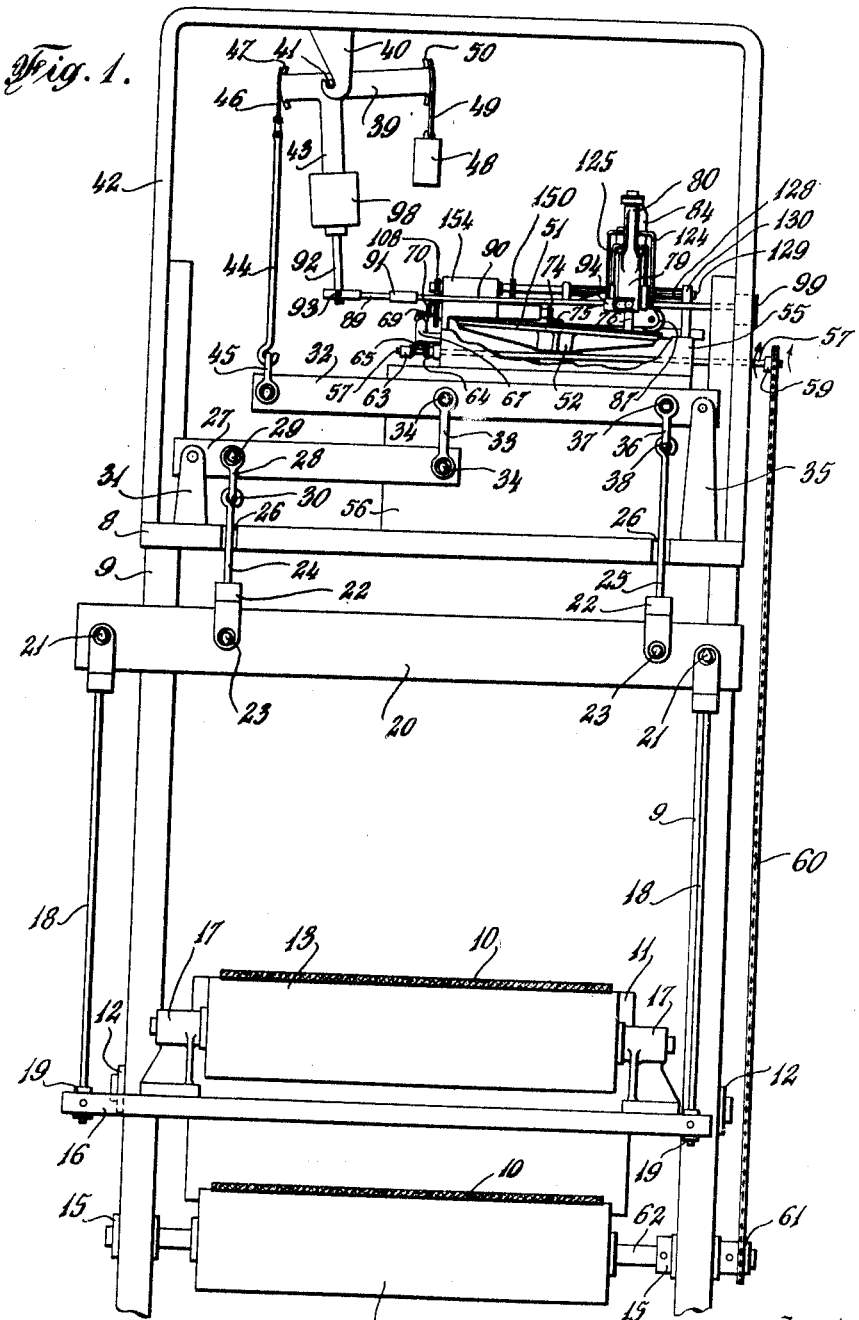
Inventor
Herbert L. Merrick, Dec.
Katherine S. Merrick, Exrx.
By John O. Seifert
Attorney

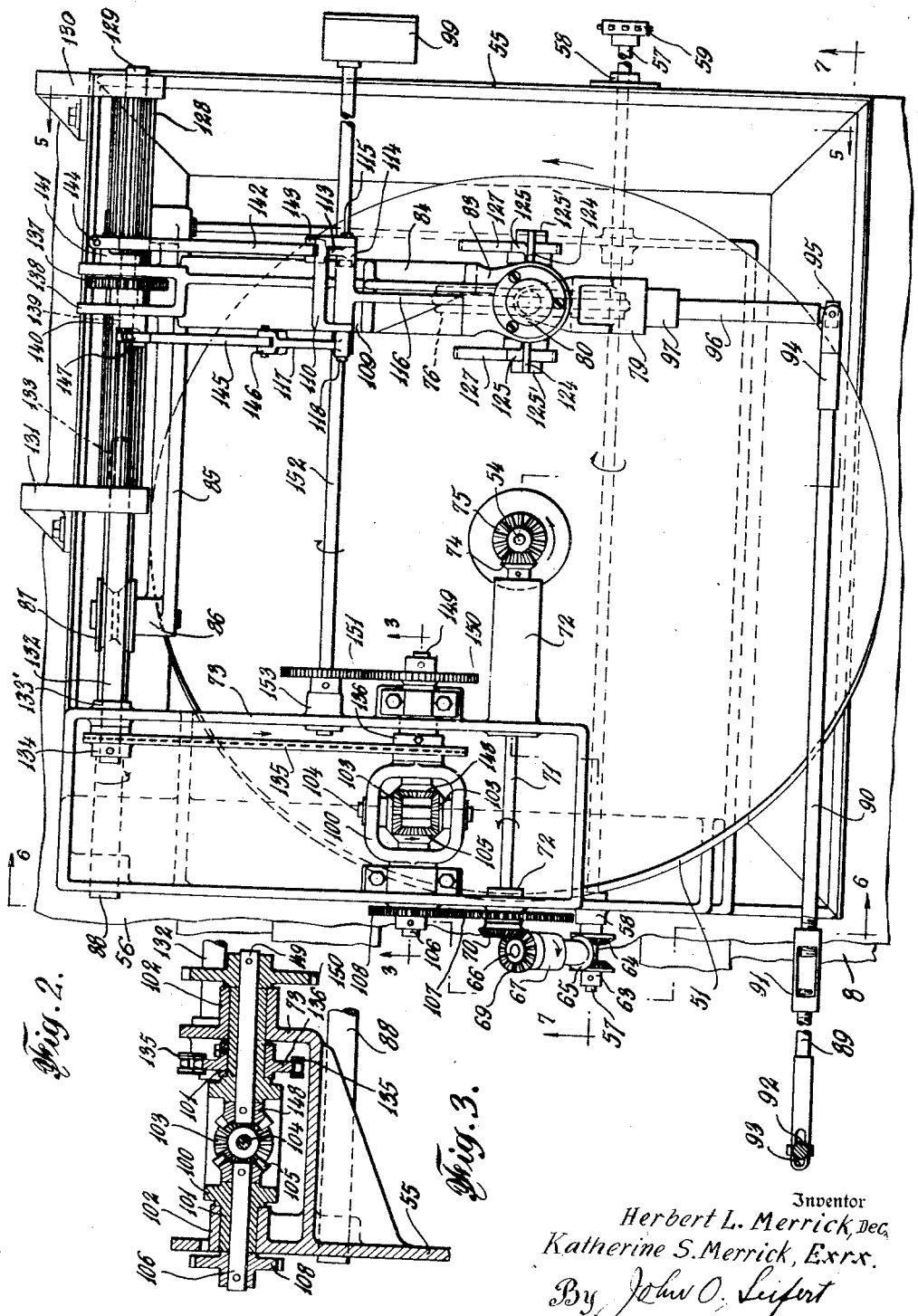

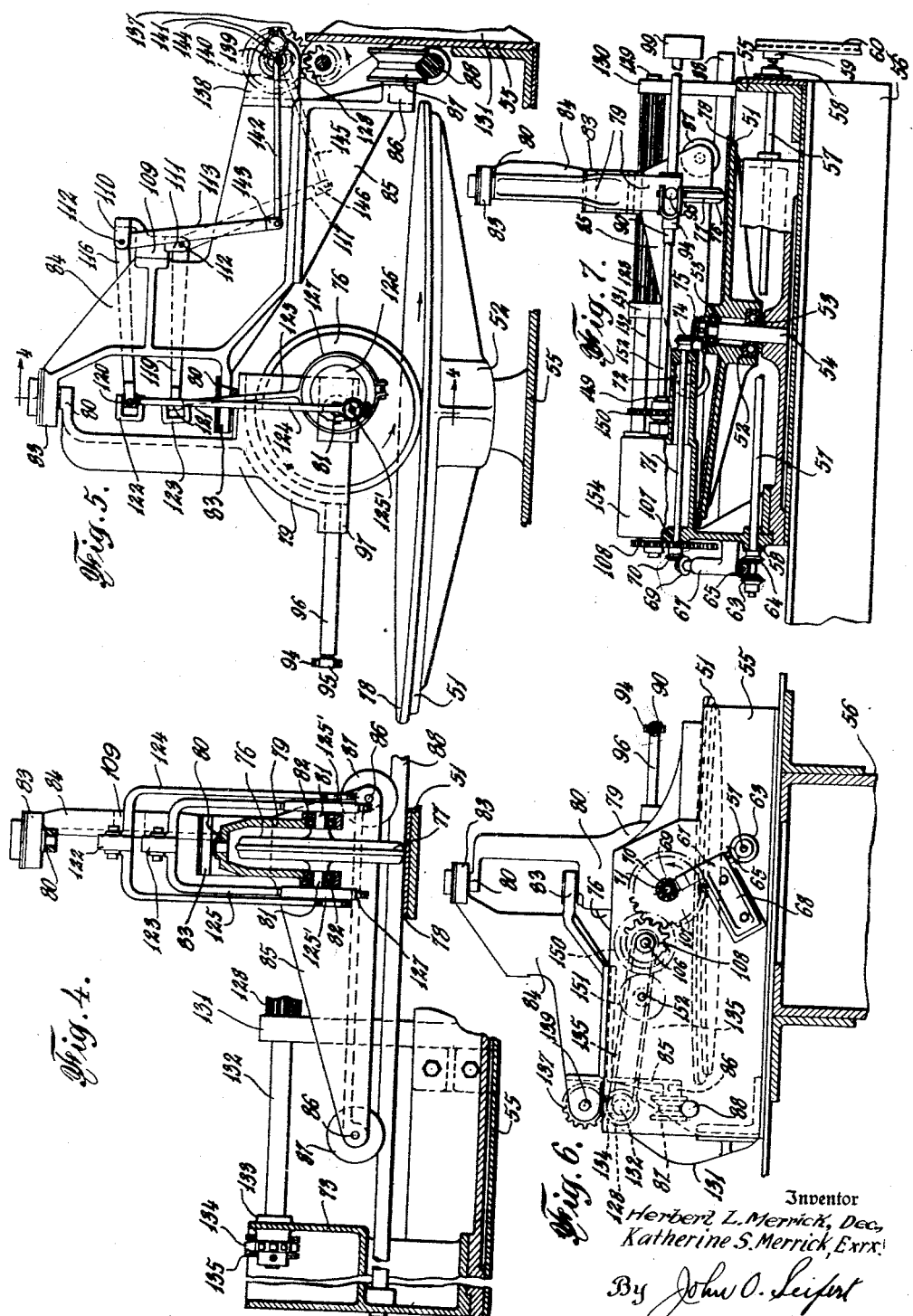

Patented June 16, 1942

2,286,297

UNITED STATES PATENT OFFICE 2,286,297

INTEGRATING MEANS

Herbert L. Merrick, deceased, late of Passaic, N. J., by Katherine S. Merrick, executrix, Passaic, N. J., assignor to Merrick Scale Mfg. Company, Passaic, N. J., a corporation of New Jersey Application November 22, 1938, Serial No. 241,734

2 Claims. (Cl. 235—61)

This invention relates to integrating means particularly adapted for use in connection with weighing mechanism including a scale beam arranged with means to support a traveling conveyer and means to balance the load transported by the conveyer operative to normally maintain the scale beam in a position of equilibrium and to counterbalance an applied load, and a register to totalize and indicate the weight of material transported by the conveyer, and it is the object of the invention to provide improved means to control the actuation of the register by the speed of travel of the conveyer and the weight of the load transported by the conveyer.

The embodiment of the integrating means comprises a rotatable disk driven by the travel of a conveyer and adapted to rotate a wheel rotatably, pivotally and slidably mounted in frictional contact with the disk, and said wheel being adapted to be actuated about its pivot support to different angular positions relative to the direction of rotation of the disk by fluctuations of the scale beam from its position of equilibrium. The angular positions of the wheel will cause the wheel to travel radially of the disk under the influence of the rotation of the disk until the wheel assumes its normal position in alinement with the direction of the travel of the disk, whereby the speed of rotation of the wheel will increase or decrease depending upon the position of the wheel relative to the center of the disk. The speed of rotation of the wheel will increase proportionally to the increase in the distance between the wheel and center of the disk. The rotations of the disk and wheel are transmitted to means to combine said rotations and give the integrated value or load transported by the portion of the conveyer supported by the scale beam.

It is another object of the invention to reduce to a minimum the friction that tends to retard the pivotal actuation of the wheel.

It is a further object of the invention to permit movement of the wheel radially of the disk without interfering with the performance of the wheel.

It is a still further object of the invention to provide walking beam mechanism in means for transmitting the rotation of the wheel to the means for combining the rotations of the wheel and disk, which mechanism will prevent said transmitting means stopping on dead center.

Further objects and advantages of the invention will be disclosed in the following detailed description of the invention.

In the drawings accompanying and forming a part of this application,

Figure 1 is an elevational end view of weighing mechanism showing the integrating means forming the embodiment of this invention operatively mounted relative to said weighing mechanism.

Figure 2 is a plan view, on an enlarged scale, of the integrating means shown in Figure 1.

Figure 3 is a sectional view, on an enlarged scale, of means for combining the rotations of the disk and wheel, taken on the line 3—3 of Figure 2 looking in the direction of the arrows.

Figure 4 is a view looking at the left of Figure 5, partly broken away and partly in section to show the mounting of the friction wheel, the section being taken on the line 4—4 of Figure 5.

Figure 5 is an elevational view, on a reduced scale, of the wheel and walking beam means, taken on the line 5—5 of Figure 2 looking in the direction of the arrows.

Figure 6 is an elevational view, on a reduced scale, of means for transmitting rotation to the disk and means for transmitting the rotation of the wheel and disk to the means for combining the rotations of the disk and wheel, taken on the line 6—6 of Figure 2 looking in the direction of the arrows.

Figure 7 is a sectional view, on a reduced scale, of the mounting of the disk, taken substantially on the line 7—7 of Figure 2 looking in the direction of the arrows.

In the embodiment of the invention illustrated in the accompanying drawings, the weighing mechanism is mounted upon a support or table 8 supported by standards 9 forming a part of the supporting structure of an endless conveyer belt 10 passing around a pair of drums, one of said drums, not shown, being driven and the other drum, shown at 11, being rotatably supported in bearings 12 on supporting structure for the conveyer spaced from the standards 9. The upper and lower stretches of the conveyer belt between the drums are supported by a plurality of idler rollers 13, 14, respectively, rotatably supported by bearings 15 in the standards 9 with one of the rollers 13 mounted on a platform 16 by standard bearings 17 fixed to the platform.

The platform 16 is suspended from the weighing mechanism by rods 18 fixed at one end to the platform, as at 19, and the opposite ends being bifurcated and arranged to loosely engage knife edges of pins fixed in and extending laterally from the opposite sides of a cross bar 20, as at 21 in Figure 1. The platform 16 and the portion of the conveyer belt passing thereover constitute a scale-platform. The bar 20 is swingingly suspended from the weighing mechanism by bifurcated members 22 having alined openings in the bifurcations for the loose engagement of knife edges of pins fixed in and extending from the opposite sides of the bar adjacent the pins 21, as at 23 in Figure 1, and the closed ends of said members being arranged with rods 24, 25 adapted to extend through openings 26 in the table 8. The rod 24 is shorter than the rod 25 and is adapted to be pivotally connected to a scale lever 27 by a stirrup member 28 having alined openings in the leg portions to loosely engage knife edges of pins fixed in and extending from opposite sides of said lever 27, as at 29, and the U portion of said member being loosely engaged by a hook portion at the free end of the rod 24, as shown at 30. The scale lever 27 is pivotally supported at one end adjacent the pins 29 by a bracket 31 fixed to the upper face of the table 8, and the opposite end of the lever is pivotally connected to an intermediate portion of another scale lever 32 by a pair of links 33 having openings at the opposite ends to loosely engage knife edges of pins fixed in and extending laterally from the opposite sides of the levers 27 and 32, as shown at 34. The lever 32 is pivotally mounted to extend above and in alinement with the lever 27 at an end remote from the lever 27 by a bracket 35 fixed to the upper surface of the table 8, and said lever 32 is pivotally connected to the rod 25 adjacent the bracket 35 by a stirrup member 36 having alined openings in the leg portions to loosely engage knife edges of pins fixed in and extending from the opposite sides of the lever 32, as at 37, and the U shaped portion loosely engaging a hook portion at the free end of the rod 25, as shown at 38.

By this arrangement, the weight on the platform is evenly supported by the scale levers 27 and 32, and is transmitted by said levers to a scale or weighing beam 39 pivotally mounted intermediate its ends by knife edge pivots extending laterally from the opposite sides of the lever to loosely engage arcuate shaped recesses in hanger brackets 40, as shown at 41. The brackets 40 are fixed to the inner surface of the top of a housing 42 mounted on the table 8 to enclose the entire weighing mechanism. The scale beam 39 is of T shape with the vertical leg portion adjacent one end and in line with pivots 41, as shown at 43 in Figure 1, and the end of the beam adjacent the leg portion 43 is connected to the free end of the lever 32 by a rod 44 having one end loosely engaging a stirrup member 45 similar to the stirrup members 28, 36 and pivotally connected to the free end of the lever 32 in the same manner as said stirrup members are connected to their respective levers, and the opposite end of the rod 44 is connected to the short end of the beam 39 by a flexible band 46 extended over and connected to an arcuate face arranged on the short end of the scale beam, as at 47. The opposite or long end of the scale beam is arranged with a compensating or counter-weight 48 connected to the beam 39 by a flexible band 49 extended over and fixed to an arcuate face of the long end of the scale beam, as at 50 in Figure 1.

The speed of the travel of the conveyer 10 and the fluctuations of the scale beam are combined and integrated to give the weight of material carried by a predetermined length of travel of the conveyer belt. The means to combine and integrate these values, comprises a disk 51 having a conical face declining inwardly from the periphery of the disk to a hub 52 rotatably and anti-frictionally supported by annular sets of ball bearings arranged in enlarged annular pockets in the hub, as at 53, and mounted on a stud shaft 54 fixed at one end in a base plate of an open top casing 55 fixedly supported on a raised platform 56 mounted on the table 8 within the housing 42. The stud shaft 54 is fixed in the casing 55 to extend obliquely to the base plate of the casing to position a portion of the conical face of the disk in a horizontal plane during the travel of the disk, as shown in Figure 7. The disk is rotated in synchronism with the travel of the conveyer belt 10 by means for transmitting the movement of the conveyer belt to the disk, comprising a shaft 57 rotatably mounted at the opposite ends in bearing bosses 58 arranged in opposite side walls of the casing 55, as shown in Figures 2 and 7, with one end of the shaft extending from the side wall of the casing 55 and adjacent side wall of the housing 42 and having a sprocket wheel 59 fixed thereto for the engagement of an endless sprocket chain 60 engaging around a sprocket wheel 61 fixed on an end of a shaft 62 of one of the idler rollers 14 extending from the outer side of the standard 9 in alinement with the sprocket wheel 59, as shown in Figure 1. The opposite end of the shaft 57 extends from the opposite side wall of the casing 55 and is arranged with a pair of opposed beveled pinions 63, 64, the pinion 63 being fixed, in the present instance, on the end of the shaft in spaced relation to the pinion 64 loosely mounted on the shaft in abutting relation with the bearing boss 58 to permit the meshing engagement of said pinions with a beveled pinion 65 fixed on one end of a shaft 66 rotatably mounted in a boss 67 arranged on a lateral arm of a bracket 68 mounted on the exterior of the side wall of the casing 55, as shown in Figures 6 and 7. The opposite end of the shaft 66 extends from the boss 67 and has a beveled pinion 69 fixed thereon in meshing engagement with a beveled pinion 70 fixed on an end of a shaft 71 rotatably mounted in bearing bosses 72 in the opposite walls of a rectangular casing 73 integral with adjacent side walls of the casing 55 at the open top thereof. The width of the casing 73 is less than half the diameter of the disk 51, so that to provide a bearing at the end of the shaft 71 positioned at the center of the disk, the inner boss 72 is extended from the frame, as shown in Figures 2 and 7. A beveled pinion 74 is fixed to the end of the shaft 71 projecting from the elongated boss 72 to mesh with a beveled pinion 75 fixed to the hub 52 of disk 51, as shown in Figure 7. The rotation of disk 51 representing the travel of the conveyer belt is one of the values to be integrated.

The other value to be integrated, which is the fluctuations of the scale beam 39 effected by variations in the load on the conveyor belt, is transmitted to a wheel 76 rotatably, pivotally and slidably mounted to extend at right angles to the horizontally extending portion of the disk 51, so that rotation of the disk is frictionally imparted to the wheel. To assure the positive transmission of said rotation of the disk to the wheel, the periphery of the wheel is arranged with a center bead and the opposite sides of the periphery tapering toward said bead, as at 77 in Figures 4 and 7, and the disk is arranged with a friction surface, as shown at 78. The wheel 76 is rotatably supported in frictional contact with the disk surface 78 in a bifurcated portion of a carrier 79 for the friction wheel having two pivot bearings 80 in vertical alinement with each other and the axis of rotation of the wheel. The wheel 76 is arranged with axial pintles 81 extending axially from opposite sides of the wheel and rotatably supported in ball bearings mounted in annular recesses formed in the ends of the bifurcation legs of the carrier 79, as shown at 82 in Figure 4. The carrier pivots 80 are rotatably mounted in legs of a bifurcation 83 at one end of a carriage 84 having at the opposite end a depending portion 85 extending laterally of the carriage in horizontal plane transversely of the pivot bearings 80 of the friction wheel carrier and arranged with bearing bosses 86 at the opposite ends thereof for the rotatable mounting of grooved rollers 87 in a horizontal plane intermediate the horizontal portion of the disk 51 and axis of the wheel 76. The carriage 84 is mounted to have movement with the friction wheel carrier 79 radially of the horizontal portion of the disk 51 by the rollers 87 engaging a straight rail 88 of circular shape in cross section supported at the opposite ends in opposite walls of the casing 55 to extend parallelly of the horizontal portion of the disk 51. By this arrangement of parts, the carriage 84 is supported at the opposite ends thereof by the wheel 76 and rollers 87, and the weight thereof on the wheel 76 will maintain said wheel in frictional contact with the surface 78 of the disk 51. The wheel 76 is moved with its carrier 79 on the pivots 80 to different angular positions relative to the disk 51 in accordance with fluctuations in the scale beam 39 by a rod composed of two sections 89, 90 adjustably connected to each other by a turnbuckle 91. The rod section 89 is pivotally connected to a reduced extension 92 of the leg portion 43 of the scale beam 39 by flattening diametrically opposite portions of the free end of the extension 92 and engaging said flattened end in a slot in an enlarged end of the rod section 89 with a pin pivotally retaining the flattened end in said slot, as shown at 93 in Figures 1 and 2. The rod section 90 is pivotally connected to the wheel carrier 79 by arranging the free end of said rod section with a bifurcated enlargement 94 and pivotally connecting it to a block 95 rotatably mounted in the free end of a rod 96 fixed in a socket in the wheel carrier 79 in line with and extending at a right angle to the axis of the wheel 76, as shown at 97 in Figure 5. The connection between the scale beam 39 and wheel 76 may be varied by adjusting the length of the rod 89, 90. A pendulum weight 98 is adjustably mounted on the leg portion 43 of the scale beam 39 for accuracy in weighing. The bead 77 of wheel 76 will facilitate the pivoting of the wheel without interfering with the rotation thereof.

The resultant of the rotations of the disk 51 and wheel 76 is recorded and indicated by a register of usual construction and shown in a general way at 99 mounted in the wall of the housing 42, and said resultant is obtained by differential means shown in Figures 2 and 3 as comprising a cage or frame member 100 having hollow trunnions 101 projecting from the exterior of opposite sides thereof and rotatably mounted in bearings 102 arranged in the longitudinal walls of the casing 73, and the trunnions retained therein by removable caps to permit replacement of the cage 100. A pair of opposed beveled pinions 103 is rotatably mounted on a shaft 104 having the opposite ends mounted in the opposite walls intermediate the walls of the cage 100 arranged with the trunnions 101 with the pinions adjacent said opposite walls and spaced from each other. The pinions 103 mesh with a beveled pinion 105 fixed on an end of a shaft 106 rotatably mounted in a trunnion 101 and the opposite end projecting from frame 73. The pinion 105 is rotated in synchronism with the rotation of the disk 51 through a gear 107 fixed on the shaft 71 meshing with a gear 108 fixed on the projecting end of shaft 106. The cage 100 with the pinions 103 is rotated in the same direction of rotation as the pinion 105 and in synchronism with the rotation of the friction wheel 76. This is accomplished by transmitting the rotation of the friction wheel to the cage 100 through walking beam means comprising a pair of bell crank levers pivotally supported by a bracket 109 fixed to an intermediate portion of the carriage 84 and having a pair of bifurcated arms 110, 111, the arm 110 extending in a horizontal plane above the block and the other arm 111 depending from the block in a vertical plane. Both arms are arranged with alined perforations in the bifurcations thereof and the perforations in one arm bifurcation being in vertical alinement with the perforations in the other arm, as shown at 112 in Figure 5. One of the bell crank levers comprises an arm 113 integral with a sleeve 114 rotatably mounted on a pin 115 fixed in the perforations 112 of the bracket arm 110, and an arm 116 integral with the sleeve 114 extending at an obtuse angle to the lever arm 113 and centrally of the bifurcations 83, as shown in Figures 2 and 5. The other bell crank lever comprises an arm 117 having a boss fixed to a shaft 118 rotatably mounted in the perforations 112 of the bracket arm 111 and an arm 119 having a sleeve fixed to the shaft 118 with the arm 119 extending at an obtuse angle to the lever arm 117 of a greater degree than the angle between the lever arms 113, 116 and in vertical alinement with the lever arm 116, as shown in Figures 2 and 5. The free ends of the lever arms 116, 119 are bifurcated for the pivotal mounting of blocks 120, 121, respectively, having the upper and lower faces rounded for the pivotal mounting of yoke members 122, 123, respectively. The yoke members 122, 123 are arranged at the center of the connecting portions of fork members 124, 125, respectively. The free ends of the fork member 124 are arranged to encircle and be retained to pins 125' fixed in and projecting laterally from the outer faces and adjacent the peripheries of disks 126 fixed to the outer ends of the pintles 81 eccentrically of said disks, whereby rotation of the friction wheel 76 will impart reciprocatory movement to the crank lever 113, 116. The free ends of the fork member 125 are arranged to encircle and be retained to the peripheries of the disks 126, as shown at 127 in Figure 5. The pivotal connection between the blocks 120, 121 and the yoke members 122, 123 will permit the actuation by the scale beam 39 of the wheel 76 on its pivots 80 without interfering with the rotation of the wheel and reciprocation of the bell crank levers 113, 116 and 117, 119 by the rotation of the wheel 76.

The reciprocations of the bell crank levers 113, 116 and 117, 119 are combined and converted into rotary movement which is transmitted to the cage 100. This is accomplished by an elongated pinion 128 having at one end an arbor 129 rotatably mounted in a bearing arranged in an upwardly extending arm of a bracket 130 fixed to a side wall of the casing 55, as shown in Figure 2. The opposite end of the pinion 128 is rotatably supported in a bearing of a bracket 131, similar to the bracket 130, as by a shaft 132 rotatably mounted in the bearing of bracket 131 and having an end secured in a recess in said end of the pinion, as shown in dotted lines at 133 in Figure 2. The bearings of the brackets 130, 131 are in vertical alinement wtih the rail 88. The opposite end of the shaft 132 is rotatably mounted in a boss 133' of the inner wall of the casing 73 with a portion extending into said casing and having a sprocket wheel 134 fixed thereon and adapted to be engaged by an endless sprocket chain 135 engaging around a sprocket wheel 136 fixed on the inner trunnion 101 of the cage 100 between the cage and the inner wall of the casing 73, as shown in Figure 3. The reciprocations of the bell crank levers 113, 116 and 117, 119 are transmitted into rotary motion of the elongated pinion 128 by a gear 137 rotatably mounted in a bifurcated portion 138 extending from the end of the carriage 84 above the rail 88 and pinion 128, and the gear 137 being fixed to a shaft 139 rotatable in the bifurcations of the portion 138 and having crank arms 140, 141 fixed on the opposite end portions extending exteriorly of the bifurcations, as shown in Figure 2. The bell crank lever arm 113 is connected to the crank arm 141 by a link 142 pivotally connected at one end to a bifurcated end of arm 113, as indicated at 143, and the opposite end of the link being arranged as a strap to encircle and be secured to the crank of the arm 141, as shown at 144. The bell crank lever arm 117 is connected to the crank arm 140 by a link 145 pivotally connected at one end to a bifurcated end of the arm 117, as at 146, and the opposite end of the link being arranged as a strap encircling and secured to the crank of arm 140, as shown at 147. The shaft 139 is mounted in the bifurcations of portion 138 to extend parallelly of and in the same vertical plane as the axis of the pinion 128 and rail 88, so that the gear 137 will mesh and have sliding engagement with the teeth of the pinion, whereby rotation of the gear will be imparted to the pinion and the gear will participate in the movement of the carriage 84 and thereby move longitudinally of the pinion 128.

The pair of pinions 103 of the cage 100 are rotated at a speed proportional to the difference in the speed of rotation of the pinion 105 representing the speed of the rotation of the disk 51 and the rotation of the cage 100 representing the speed of rotation of the wheel 76. This difference in speed represents the weight of the material transported by a predetermined length of conveyer travel and is transmitted to the register 99 by a beveled pinion 148 fixed on a shaft 149 in meshing engagement with the pinions 103. The shaft 149 is rotatably mounted in the trunnion 101 of the cage in which the sprocket wheel 136 is fixed, with the end of the shaft extending from the trunnion and inner wall of casing 73 and having a gear 150 fixed thereon meshing with a gear 151 fixed on a shaft 152 rotatably mounted at one end in a bearing boss 153 arranged in the inner wall of the casing 73 and extending transversely above the disk 51 and connected at the opposite end to the register, as shown in Figure 2.

In the operation of the device, the position of the friction wheel outwardly from or toward the axis of the disk will depend on the travel of the conveyer belt and whether beveled pinion 63 or beveled pinion 64 is fixed to the shaft 57. In the present description of the operation of the device, the upper idler roller 13 is rotated in a counter-clockwise direction and the idler roller 14 is rotated in a clockwise direction by the conveyer belt 10, looking at the right of Figure 1. The shafts 62 and 57 will be rotated in a clockwise direction by the clockwise rotation of the idler roller 14. The beveled pinion 63 being fixed to the shaft 57 will impart rotation to the shaft 66 in a clockwise direction, looking at Figure 2, and the beveled pinion 69 meshing with beveled pinion 70 will rotate shaft 71 in a clockwise direction, looking from the right end of Figure 2. The shaft 71 will rotate the disk 51 in a counter-clockwise direction through the meshing beveled pinions 74, 75. The friction wheel 76 will be rotated in a counter-clockwise direction, looking at the right of Figure 2, and through the bell crank levers 113, 116 and 117, 119, the gear 137 and elongated pinion 128, the shaft 132 will be rotated in a counter-clockwise direction looking at the right of Figure 2, as indicated by the arrow in Figure 5. The beveled pinion 105 will be rotated in a counter-clockwise direction by the clockwise rotation of gear 107 through the shaft 71 and the counter-clockwise rotation of the gear 108 meshing with gear 107 looking from the right of Figure 2. The cage will be rotated in counter-clockwise direction by the counter-clockwise rotation of the shaft 132 through the sprocket wheels 134, 136 and sprocket chain 135 looking from the right of Figure 2. The position of the scale beam 39 determines the position the friction wheel 76 will assume on the horizontal portion of the friction disk 51 by the connection of the friction wheel carrier 79 through the rod 89, 90 with the beam arm 43. As shown in Figure 2, the friction wheel has been caused to assume a position on the friction disk outwardly toward the periphery from a position radially inward toward the axis of the disk with the axis of rotation of the friction wheel extending in a plane to intersect the axis of the friction disk by an increase in the weight of the material on the conveyer belt 10 moving the short end of the scale beam 39 downwardly against the weight of the counter-weight 43 and actuating to the right, as viewed in Figure 2, the rod 90 connecting the beam arm 43 to the friction wheel carrier 79. This movement of the scale beam through its connection with the friction wheel carrier 79 actuated said carrier about its pivot support 80 in the carriage 84 to change the angular position of the axis of rotation of the friction wheel relative to the friction disk 51 and causes the friction wheel to travel outwardly toward the periphery of the friction disk and the carriage 84 for said carrier to move in the same direction on the rail 88 until the friction wheel assumed a position with the axis of rotation thereof extending in a plane intersecting the axis of the friction wheel, as shown in Figure 2. The positioning of the friction wheel outwardly toward the periphery of the friction disk increases the speed of rotation of the friction wheel and correspondingly increases the speed of rotation of the differential cage 100 which is transmitted to the beveled pinion 148 and shaft 149 of the differential and from the latter through the gears 150, 151 to the register actuating shaft 152. The decrease in the weight on the conveyer belt will have an opposite effect on the scale beam 39 and cause the friction wheel to assume a position toward the center of the friction disk 51 and a proportional decrease in the speed of rotation of the friction wheel and a reduction in the actuation of the register.

The differential means 100, 103, 105, 148, may be protected from accumulation of dirt by providing a cover for the casing 73, as shown at 154 in Figures 1 and 7.

Having thus described the invention, it is claimed:

1. In integrating means, a friction disk rotated in correspondence with the value of one of the quantities to be integrated, a friction wheel, a carriage movable in a plane transversely of the friction disk, a carrier supporting the friction wheel to rotate about its axis pivotally mounted in the carriage to have adjustment with the friction wheel about an axis perpendicular to the axis of rotation of the friction wheel and position the friction wheel to frictionally engage the disk with the axis of the friction wheel normally extending in a plane intersecting the axis of the friction disk, means to adjust said carrier with the friction wheel about its pivot support in the carriage and change the angular position of the axis of rotation of the friction wheel relative to the friction disk and cause said friction wheel to travel radially of and assume different positions on the disk in correspondence with fluctuations in the value of the other quantity to be integrated, and means to combine the rotations of said disk and said friction wheel to give the integrated value, comprising differential gearing, an elongated pinion rotatable on an axis parallelly of the movement of the carriage, means to operatively connect and transmit the rotation of said pinion to an element of the differential gearing, a gear rotatably carried by and participating in the movement of the carriage meshing with said pinion, means to transmit the rotation of the friction wheel to said gear, and gearing operatively connecting another element of the differential gearing with and rotate the same at a speed proportional to the rotation of the disk.

2. In integrating means, a friction wheel rotated in correspondence with the value of one of the quantities to be integrated, a friction wheel, a carriage movable in a plane transversely of the friction disk, a carrier supporting the friction wheel to rotate about its axis pivotally mounted in the carriage to have adjustment with the friction wheel about an axis perpendicular to the axis of rotation of the friction wheel and position the friction wheel to frictionally engage the disk with the axis of the friction wheel normally extending in a plane intersecting the axis of the friction disk, means to adjust said carrier with the friction wheel about its pivot support in the carriage and change the angular position of the axis of rotation of the wheel relative to the friction disk and cause said friction wheel to travel radially of and assume different positions on the disk in correspondence with fluctuations in the value of the other quantity to be integrated, and means to combine the rotations of said disk and said friction wheel to give the integrated value, comprising differential gearing, gearing operatively connecting and rotating an element of the differential gearing from the friction disk, an elongated pinion rotatable on an axis extending parallelly of the plane of movement of the carriage and operatively connected to and transmitting the rotation thereof to another element of the differential gearing, a gear carried by the carriage meshing with and movable longitudinally of the pinion by the movement of the carriage, and means to transmit the rotation of the friction wheel to said gear including a pair of bell crank levers, one arm of each of said levers being connected eccentrically to opposite sides of said gear and the other arm of each lever connected eccentrically to the friction wheel.

KATHERINE S. MERRICK.
*Executrix of the Estate of Herbert L. Merrick, Deceased.*